US005907154A

United States Patent [19]

Shimomura

[11] Patent Number: 5,907,154

[45] Date of Patent: May 25, 1999

[54] IONIZATION DEVICE

[75] Inventor: Manabu Shimomura, Kyoto, Japan

[73] Assignee: Shimadzu Corporation, Kyoto, Japan

[21] Appl. No.: 09/104,096

[22] Filed: Jun. 24, 1998

[30] Foreign Application Priority Data

Jul. 31, 1997 [JP] Japan .................................... 9-220691

[51] Int. Cl.[6] ...................................................... B01D 59/44

[52] U.S. Cl. ....................................... 250/288; 315/111.81

[58] Field of Search ............................ 73/31.03; 250/288, 250/389, 374; 361/213; 324/33; 315/111.81

[56] References Cited

U.S. PATENT DOCUMENTS 4,093,913 6/1978 O'Neal, III ............................... 324/33
4,849,628 7/1989 McLuckey et al. .................... 250/288
5,296,713 3/1994 Tanaka .................................... 250/423

*Primary Examiner*—Michael Brock
*Assistant Examiner*—Thuy Vinh Tran
*Attorney, Agent, or Firm*—Majestic, Parsons, Siebert & Hsue P.C.

[57] ABSTRACT

An ionization device has an ionization chamber in which sample molecules are ionized, an electrode such as a repeller electrode affixed to the ionization chamber through an insulating holder member having a surface exposed to the interior of the ionization chamber, and a detector for detecting the changes in the resistance of this insulating holder member. As contaminants are deposited on the inner walls of the ionization chamber, they are also deposited on the exposed surface of the insulating holder member, affecting the resistance value of the insulating holder member. The level of contamination inside the ionization chamber can be estimated by monitoring the output of the detector.

5 Claims, 2 Drawing Sheets

IONIZATION DEVICE

BACKGROUND OF THE INVENTION

This invention relates to an ionization device used, for example, as a part of a mass spectrometer.

A mass spectrometer generally operates such that sample molecules are ionized inside an ionization chamber and these ions are then separated and detected according to their mass numbers, or the mass per unit electric charge. The interior of the ionization chamber is usually maintained at a high degree of vacuum but residual gas components become attached to the inner walls of the chamber as the analysis continues, contaminating the chamber. In the case of ionization devices relying on a chemical ionization process, contamination is further caused by the reaction gas components which are introduced into the ionization chamber to be ionized.

If the interior of an ionization device becomes thus contaminated with undesirable components, the conditions for the generation of ions are adversely affected and the production rate of the ions is reduced. As a result, the sensitivity of the analysis may become lowered or the accuracy of the analysis may be affected because of the noise caused by such contaminants. In order to make it possible to carry out analyses dependably, it is necessary to disassemble the device and clean its components such that the contamination of the ionization chamber does not become too serious.

With prior art ionization devices, however, the degree of contamination cannot be determined from outside. Thus, the common practice has been to subject it to a cleaning process after analyses have been carried out for a specified length of time. As a result, it sometimes happens that an analysis is continued although the actual contamination has reached an unallowable level, especially in the case of a lengthy analysis, such that the sensitivity of the analysis drops in the middle of the work. It also happens sometimes that the device is disassembled for cleaning although the contamination has not reached an advanced level yet. This is a waste of both time and labor.

SUMMARY OF THE INVENTION

It is therefore an object of this invention in view of the above to provide an improved ionization device with which the level of contamination inside its ionization chamber can be accurately detected from outside.

An ionization device embodying this invention, with which the above and other objects can be accomplished, may be characterized as comprising not only an ionization chamber in which sample molecules are ionized but also an electrode affixed to the ionization through an insulating member having a surface exposed to the interior of the ionization chamber for drawing the ions to the exterior of the ionization chamber, as well as a detector means for detecting the changes in the resistance of this insulating member. In the above description, the electrode may be a so-called repeller electrode for driving the ions out of the ionization chamber by the electrostatic repulsive force or may otherwise function as a guide for electrostatically guiding the ions out of the ionization chamber.

Since a positive or negative voltage of a specified magnitude is applied to such an electrode, it is secured to the ionization chamber, normally at a ground potential, through an insulating member of a known kind. The detector means may serve, for example, to detect the weak current which passes between the electrode and the ionization chamber during a period when no ionization is taking place to thereby measure the resistance of the insulating member. As the inner walls of the ionization chamber are contaminated, the contaminants are also attached to the portion of the surface of the insulating member exposed to its interior, thereby adversely affecting the insulative characteristic of the insulating member. Thus, it is possible to estimate the level of contamination inside the ionization chamber by monitoring the output of the detector means and to properly determine whether the ionization chamber should be cleaned or not.

A threshold value may preferably be set initially such that a warning signal is automatically outputted when the measured resistance of the insulating member becomes lower than this preliminarily set threshold value.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, like or equivalent components are indicated by the same numerals even where they are components of different devices and may not necessarily be described repetitiously.

DETAILED DESCRIPTION OF THE INVENTION

Figure 1:
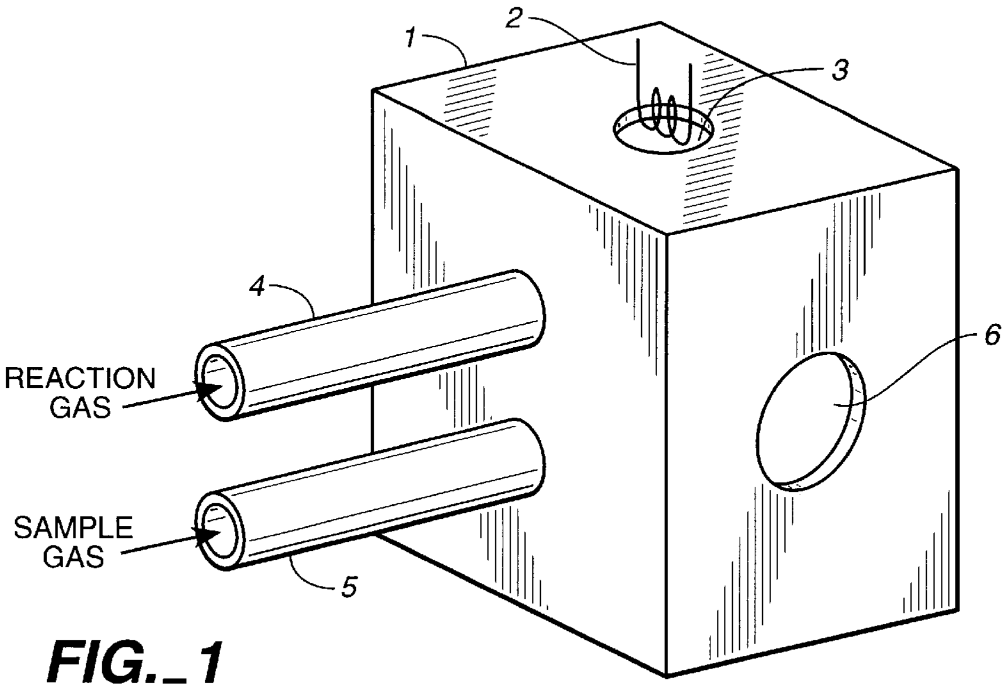
FIG. 1 is a schematic external diagonal view of an ionization device embodying this invention.
Figure 2:
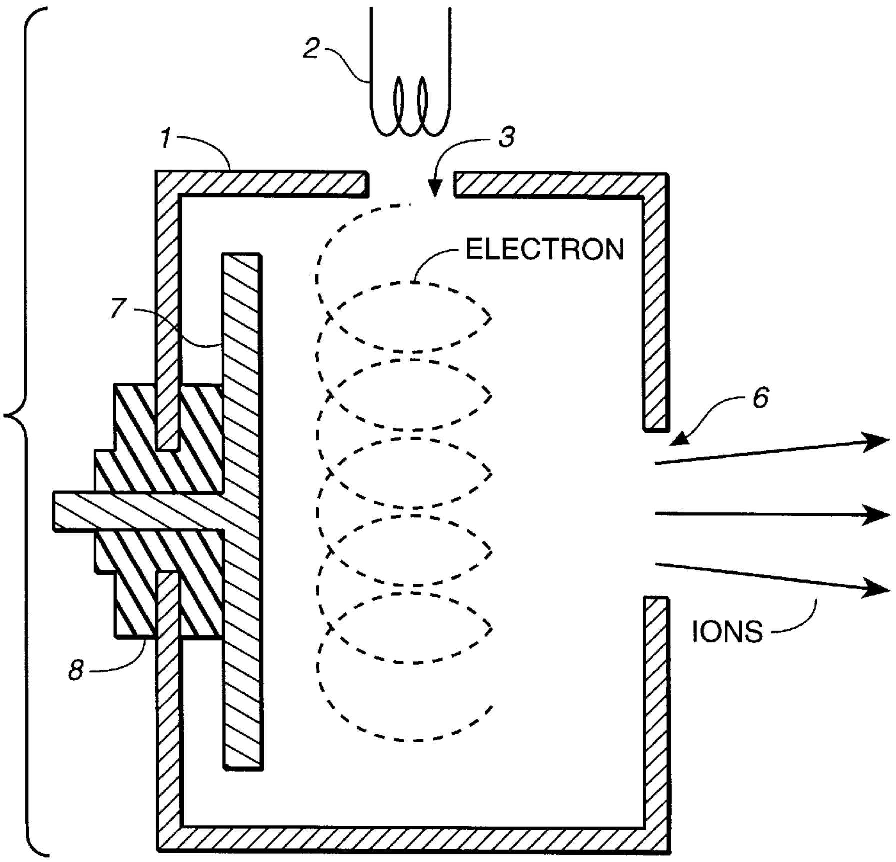
FIG. 2 is a schematic sectional view of the ionization device of FIG. 1.

FIGS. 1 and 2 show schematically an ionization device embodying this invention for using a chemical ionization method, having an ionization chamber 1 into which a reaction gas such as ammonia is introduced through a reaction gas tube 4 and electrons generated by a filament 2 are injected through an electron injecting window 3 such that the reaction gas will be ionized. A sample gas is introduced through a sample tube 5 into this ionized reaction gas such that the sample gas molecules are ionized. A repeller electrode 7 is secured to a side wall through an electrically insulating holder member 8. Since a voltage of the same polarity as that of the ionized sample gas molecules is applied to the repeller electrode 7, the generated ions are electrostatically repelled therefrom and are ejected to the exterior through an ion outlet 6 formed on the opposite side wall.

The ionization chamber 1 is normally grounded and is electrically insulated, as explained above, from the repeller electrode 7. As the ionization process is carried out inside the ionization chamber 1 as described above, molecules of the reacting gas, residual gas molecules and molecules of the sample gas become attached to the inner walls of the ionization chamber 1, forming a thin film of these components on the surface of the insulating holder member 8 between the ionization chamber 1 and the repeller electrode 7 and thereby adversely affecting the resistive characteristic of the holder member 8. In other words, the resistance value of the holder member 8 becomes smaller.

Figure 3:
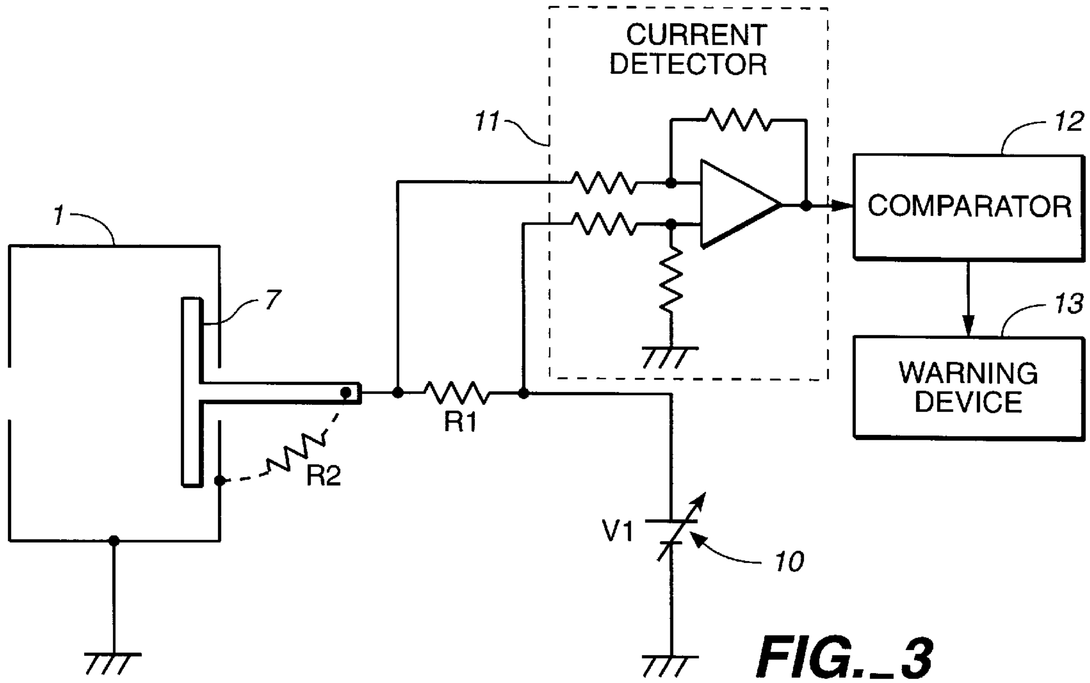
FIG. 3 is a circuit diagram of a portion of the ionization device of FIGS. 1 and 2.

FIG. 3 shows a circuit which is used to detect this change in the resistance value of the holder member 8. As shown in FIG. 3, voltage V1 is applied to the repeller electrode 7 from a direct-current voltage source 10 through resistor R1, while the ionization chamber 1 is grounded. Both ends of the resistor R1 are connected to a current detector 11 and an output therefrom, corresponding to the voltage difference between the ends of the resistor R1, is transmitted to a comparator circuit 12, to be described below.

Before there is any contamination inside the ionization chamber 1, there is no contaminant on the surface of the holder member 8 exposed to the interior of the ionization chamber 1 and the resistance R2 through the holder member 8 is nearly infinitely large. Thus, there is no current flowing through the resistor R1 if there is no ionization inside the ionization chamber 1. If there is ionization, there is a current through the resistor R1 because some of the electrons are captured by the repeller electrode 7.

As ionization is started and contaminants begin to be deposited on the inner walls of the ionization chamber 1, the surface of the holder member 8 exposed to the interior of the ionization chamber 1 is also contaminated similarly. As a result, the resistance R2 therethrough becomes smaller, and a weak current is caused to flow, when there is no ionization process going on, from the direct-current voltage source 10 through the resistor R1, the repeller electrode 7 and the holder member 8 (or the resistance R2) to the ionization chamber 1. The current detector 11 then serves to output a detection signal corresponding to the intensity of this weak current.

As the degree of contamination increases, the resistance R2 becomes smaller, the current through the resistor R1 grows and the detection signal from the current detector 11 becomes larger. Thus, the user can estimate the degree of contamination inside the ionization chamber 1 on the basis of the detection signal. The function of the comparator circuit 12 is to compare the received detection signal with a pre-selected threshold value and to send a warning signal to a warning device 13 if the detection signal has passed the threshold value. The threshold value is pre-selected on the basis of the magnitude of the detection signal which is outputted when the condition of contamination inside the ionization chamber 1 is such that it requires a cleaning operation. The warning device 13 may be a display device, an alarm or any such output means, serving, for example, to switch on an alarm lamp when a warning signal is received from the comparator circuit 12. Thus, the user can be dependably informed that the contamination inside the ionization chamber 1 has reached a point where it must be, for example, disassembled for cleaning.

Before a continuous analysis expected to take a relatively long period of time is started, it is preferable to set the threshold somewhat lower such that a warning signal will be outputted even if the degree of contamination is somewhat lower.

Figure 4:
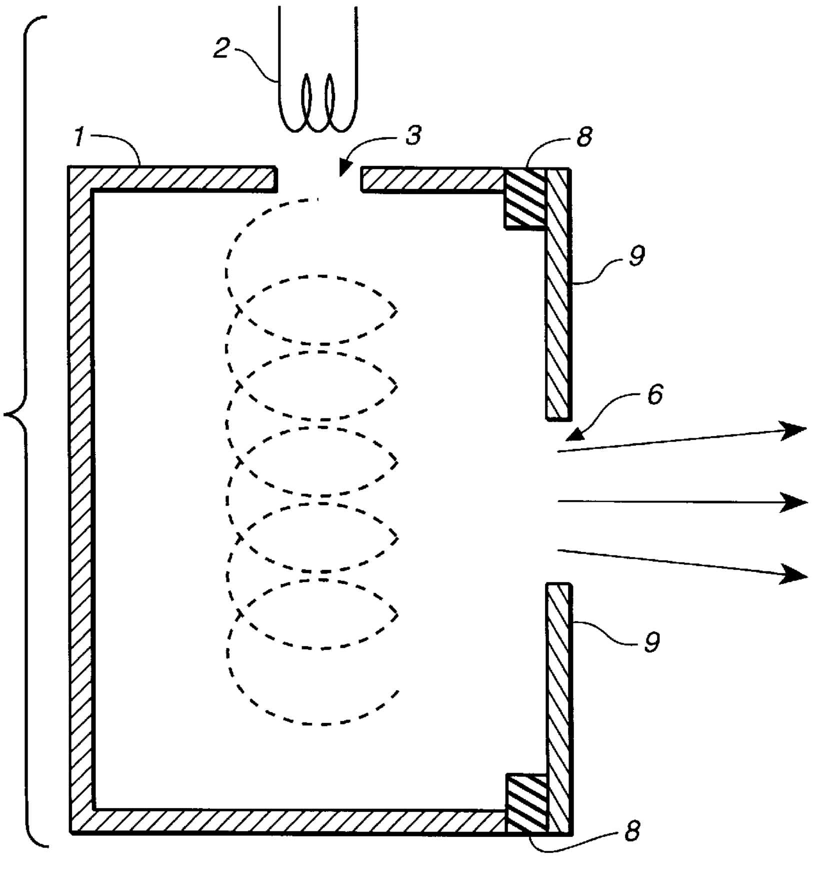
FIG. 4 is a schematic sectional view of another ionization device embodying this invention.

The embodiment of the invention described above with reference to FIGS. 1–3 is not intended to limit the scope of the invention. Many modifications and variations are possible within the scope of the invention. FIG. 4 shows another ionization device embodying this invention characterized as having an ion-drawing electrode 9 provided around the ion outlet 6 instead of the repeller electrode of FIG. 2. A voltage with the opposite polarity to that of the ionized sample gas molecules is applied to the ion-drawing electrode 9 such that these ionized molecules are electrostatically attracted towards it and ejected out through the ion outlet 6. As shown in FIG. 4, this ion-drawing electrode 9 is affixed to the ionization chamber 1 through holder members 8 of an electrically insulating material having surfaces exposed to the interior of the ionization chamber 1. A circuit as shown in FIG. 3 may also be used with the ionization device shown in FIG. 4 to determine the degree of contamination inside the ionization chamber, as explained above.

In summary, an ionization device according to this invention can allow its user to monitor the degree of contamination inside its ionization chamber although it used to be necessary for the user to guess on the basis, for example, of the cumulative total length of operating time. Thus, the user can clean the device in a timely manner only when the cleaning is actually necessary. It now goes without saying that the present invention is applicable to other kinds of ionization chambers such as those using the so-called electron impact method of ionization.

What is claimed is:

1. An ionization device comprising:

an ionization chamber for ionizing sample molecules therein;

an electrode secured to said ionization chamber through an insulating holder member, said holder member having a surface exposed to the interior of said ionization chamber; and a detector for detecting changes in electrical resistance of said holder member.

2. The ionization device of claim 1 wherein said ionization chamber has an outlet and said electrode is positioned with respect to said outlet such that a voltage of selected polarity applied to said electrode causes molecules ionized inside said ionization chamber to be ejected out thereof through said outlet.

3. The ionization device of claim 1 wherein said detector serves to detect an electric current which flows through said holder member between said electrode and said ionization chamber while there is no ionization taking place inside said ionization chamber.

4. The ionization device of claim 3 further comprising a comparator for making a comparison between said detected current and a preliminarily defined threshold value and to output a warning signal, depending on the result of said comparison.

5. The ionization device of claim 4 further comprising a warning device for outputting a warning in response to said warning signal.

* * * * *